Jan. 1, 1946.  L. L. SEYMOUR  2,392,194
APPARATUS FOR FORMING TUBING
Filed April 2, 1942   2 Sheets-Sheet 2
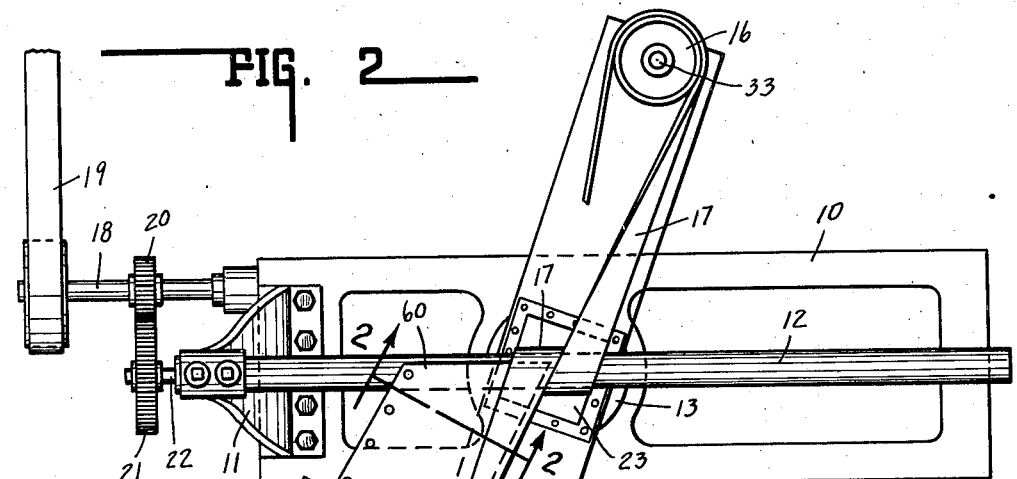
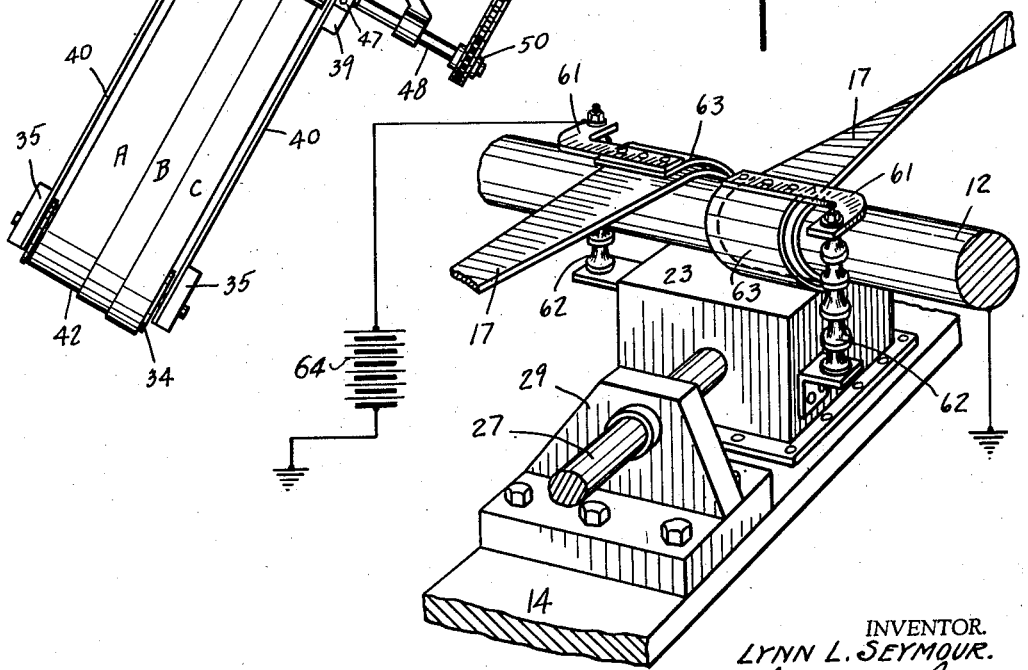
INVENTOR.
LYNN L. SEYMOUR.

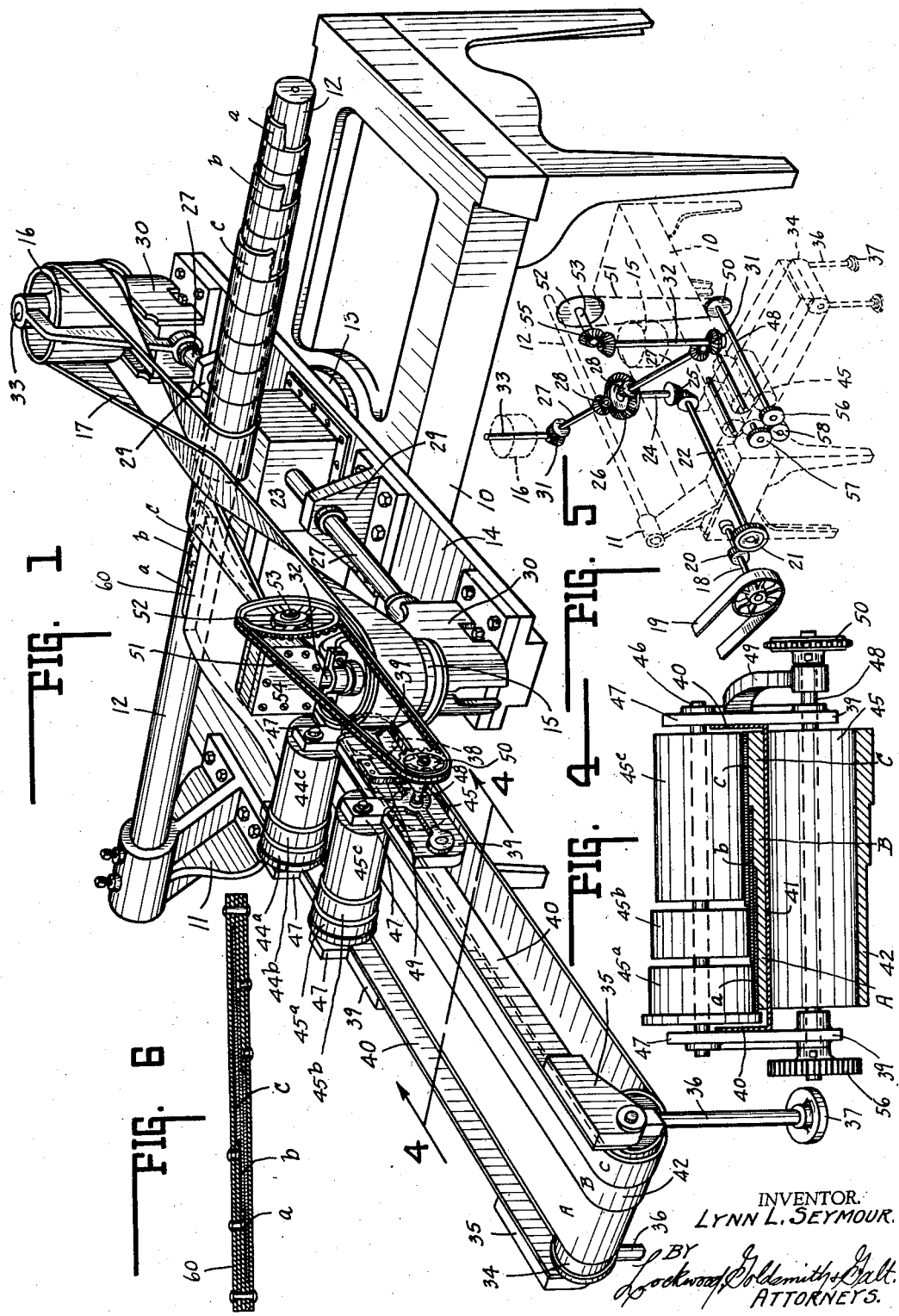

Patented Jan. 1, 1946

2,392,194

UNITED STATES PATENT OFFICE 2,392,194

APPARATUS FOR FORMING TUBING

Lynn L. Seymour, De Kalb, Ill., assignor to The Rudolph Wurlitzer Company, Chicago, Ill., a corporation Application April 2, 1942, Serial No. 437,415

9 Claims. (Cl. 144—268)

This invention relates to an apparatus for forming tubing wherein a plurality of strips of veneer, paper or like material are continuously and spirally wound one over the other about a cylindrical mandrel and slidably discharged therefrom to form a tubular structure.

It is the object of the invention to continuously form a multiple layer tubing of veneer, paper or the like, and wherein the strips forming the several plies may be of miscellaneous and short lengths but glued together. The apparatus or machine employed for this purpose functions to continuously feed prearranged overlapping plies of the material to the mandrel wherein said plies are fed thereto in the same relation in which they are wound, and wherein the feed of the plies is such as will handle said strips of varying short lengths with their ends abutting.

Another feature of the invention resides in the apparatus for continuously directing the prearranged series of strips about the mandrel as they are fed thereto, drawing them about the mandrel, exerting substantial pressure thereon, and thereby causing the finished tubing to be slidably fed from the mandrel.

Another feature of the invention resides in the apparatus associated with the forming and pressure mechanism for effecting a final setting or polymerization of the resin glue previously applied to the strips. This is accomplished by developing a high frequency electrical current directed through the windings while they are being formed under pressure. Such field is created through the provision of a curved shoe surrounding the forming and pressure apparatus, which serves as one electrode for a source of high frequency electrical current, the mandrel forming the other electrode.

The full nature of the invention will be understood from the accompanying drawings and the following description and claims:

Fig. 1 is a perspective view showing the feed and forming apparatus with the power drive and heating apparatus removed. Fig. 2 is a plan view thereof with the power drive shown. Fig. 3 is a portion of the machine shown in Fig. 1 with the heating apparatus applied thereto. Fig. 4 is a section taken on the line 4—4 of Fig. 1. Fig. 5 is a diagrammatical illustration of the driving distribution. Fig. 6 is a section taken on the line 2—2 of Fig. 2.

In the drawings there is shown a supporting table 10 carrying a heavy bracket 11 at one end thereof, which bracket supports a fixed cylindrical mandrel 12. Said mandrel has no other fixed support, being free at its opposite end for discharge of the formed tubing therefrom. Mounted upon the table 10 there is a turret 13 carrying a supporting beam 14 normally extending crosswise of the table and mandrel at a prescribed angle thereto. Said turret is mounted for relative rotation with respect to the supporting table 10 for adjusting the beam in its angular relation to the mandrel, any suitable means such as a latch or locking pin, not shown, being employed for locking the turret in its adjusted position. At each end of the beam 14 there is provided a pulley 15 and 16, respectively, mounted to rotate about a vertical axis. Said pulleys carry therebetween and drive a winder and pressure belt 17. Said belt is preferably of substantial width and normally of slightly smaller width than the width of the strips to be wound. As herein shown, said winder belt is arranged to wrap or make one loop around the mandrel and about the veneer strips spiralled thereon.

For driving the pulleys 15, 16 a shaft 18 is driven from any suitable source of power indicated herein by the belt 19. Said shaft carries a pinion 20 meshing with and driving a gear 21 which is keyed to shaft 22 supported on suitable bearings carried by the table 10 and extending longitudinally thereof directly under the mandrel 12 into a gear housing 23 supported upon the beam 14. Said gear housing carries a vertical shaft 24 driven by shaft 22 through the beveled gears 25. The upper end of the shaft 24 is provided with a beveled ring gear 26 driving the shafts 27 through the beveled gears 28. The shafts 27 extend longitudinally of the beam and are supported by the bearing brackets 29. The far ends of the shafts 27 extend into the gear cases 30 and drive through the beveled gears 31 the vertical shafts 32 and 33, respectively. Said shafts 32 and 33 are mounted in suitable bearings and have keyed thereon the pulleys 15 and 16, respectively.

Through the above-described power distribution the pulleys 15 and 16 are rotated at a predetermined speed to drive the belt for winding and forming under pressure the strips as hereinafter more particularly described.

For feeding the strips to the mandrel and belt, there is associated therewith, on one side of the table 10, a continuously operated endless conveyor. It is to be noted, for the reasons hereafter mentioned that this conveyor extends at a predetermined angle to the mandrel, depending upon the width of the strips to be wound and the diameter of the tube.

For supporting the conveyor there is provided an idler roller 34 at the feeding end, which roller is rotatably supported by the end bearings 35. Said end bearings are in turn supported upon the legs 36 having feet 37 so that the position of the conveyor may be changed. The conveyor passes about a driving roller 38 at its discharge end, which driving roller is supported by brackets 39 connected with the end bearings 35 by the side boards 40 and bed plate 41.

Said conveyor, generally indicated at 42, is in the form of a belt which is stepped up laterally to provide three thicknesses separated by shoulders, and thereby conforming to the overlapping strips. As best shown in Fig. 4, said conveyor is provided with a thinner section A to receive the lower innermost strip indicated at a, and of the same width. The stepped up section B is thicker than the section A by the thickness of a strip to carry the overhanging portion of the overlapping strip b. The section C is similarly stepped up the thickness of a strip to carry the overhanging portion of the strip c. Thus, the strip a is carried and guided between the side board 40 and the stepped up shoulder of the section A. The strip b is carried with one end abutting the stepped up shoulder of the section C, and the strip c is carried with one edge abutting the opposite side board 40.

Associated with the conveyor driving roller 38 there is a series of pressure rollers 44a, 44b and 44c. Associated with the driving roller 38, parallel to and spaced therefrom, there is a driving roller 45 having associated therewith the pressure rollers 45a, 45b and 45c. Said driving rollers are driven in the manner hereinafter described, whereby the conveyor is driven under said pressure rollers. Thus, the strips as they are manually placed upon the conveyor are carried between the driving and pressure rollers to be fed against each other under end pressure to the mandrel. It will be noted that the pressure rollers are of different diameters to conform with the varying surface elevations of the overlapping strips a, b and c corresponding thereto. They are free to be rotated, through the action of the driving rollers, upon the spindles 46 carried in the brackets 47.

The driving roller 45 is keyed to a shaft 48 having its bearing in the side brackets 39 and a bracket 49 secured thereto. Keyed to the end of the shaft 48 there is a sprocket wheel 50 which is driven by a chain 51 from a driving sprocket 52 keyed to a shaft 53 having its bearing in the gear casing 54. Said shaft 53 is driven through the beveled gears 55 by the shaft 32 upon which the pulley 15 is keyed. The shaft 48 of said driving roller 45 carries on the opposite end thereof a gear 56 which drives a gear 57. This gear is keyed to the end of the shaft carrying the driving roller 38, whereby said roller is driven with roller 45 through the intermediate gear 58 supported upon the bracket 39.

Immediately adjacent the feeding end of the conveyor and in alignment therewith, there is provided a fixed guiding apron 60, as shown in Fig. 6, for receiving and confining the strips in their overlapping relation and directing them to and tangentially of the mandrel. Said guiding apron is formed of a plurality of superimposed sheet metal plates riveted together, each plate being of substantially the thickness of one of the strips passing therethrough. Said plates are offset to provide the spacing arrangement therebetween conforming to the overlapping arrangement of the strips a, b and c. Thus, the apron is formed to provide internal and laterally stepped sections of different elevations to conform with and maintain said strips in their prearranged and overlapping arrangement, for receiving, confining and directing such group of strips to the mandrel in the overlapping formation in which they are to be finally wound in spiral form. During the passage of the strips through this confining guide the abutting ends of the short sections thereof are forcibly pressed together by causing the conveyor and feed rollers to operate faster than the belt 17 is driven. Such speed differential is obtained through suitable relation between the driving gears 50, 52, which drive the feed rollers and belt respectively, taking into consideration the diameter of the feed rollers and the pulley 15. This creates a longitudinal pressure along each strip and against the abutting end joints thereof to the extent of the frictional resistance between the strips and belt, beyond which slippage will occur.

As the prelapped and associated strips pass through the guide 60, the outermost strip c is engaged under the edge of the belt 17 and thereby forced about the mandrel. The overlapping edge of the strip c similarly carries about the mandrel the strip b which in turn carries the strip a thereabout. Thus, the strips are carried about the mandrel until they are all wrapped spirally within the belt 17. As they are drawn by the belt, assisted by the feeding and pressure rollers, they are spirally wound about the periphery of the mandrel and at the same time caused to move longitudinally thereof due to their spiralling. During such time as they pass under the belt they are subjected to substantial pressure through the wrapping of the belt thereabout.

It is desirable to simultaneously apply pressure and heat to the strips as they are wound about the mandrel, and particularly wherein the butt ends and windings are secured together by a resin glue. For example, it is found to be preferable to apply a coating of resin glue in liquid form to the strips, or impregnate the material therewith before they are fed onto the conveyor, the liquid resin glue being permitted to dry, or partially dry. With this application of adhesive, the final setting or polymerization takes place through the application of suitable heat simultaneous with the application of the pressure of the belt in forming the windings about the mandrel.

For the purpose of applying suitable heat to effect the final setting of the glue and the strips under pressure, and as shown in Fig. 3, there is mounted upon the gear housing 23 a heating unit for providing a high frequency electrical field about that portion of the mandrel, tubing and pressure and forming belt as the forming and pressure operation occurs. To provide such a field, said unit comprises a pair of bracket members 61 supported by the insulators 62 and carrying between them a spirally wound electrode plate 63. Said electrode plate 63 follows the same spiral winding as the belt 17 so as to surround the same. Said spiral electrode provides one terminal for a high frequency electrical current from a suitable source indicated at 64, whereas the mandrel 12 provides the other electrode therefor so that the veneer strips winding therebetween under pressure from the belt become highly heated to effect the final setting or polymerization of the resin glue.

As the operation progresses, the rotating movement given to the spiral windings by the belt 17, coupled with the feeding pressure exerted by the feeding rollers, gradually winds the formed tubing longitudinally of the mandrel for discharge therefrom.

Whereas the invention has been herein shown for purposes of illustration as pertaining to a three ply tube of a certain diameter, and width of strip, it is to be understood that different diameters and widths of strips may be provided by changing the mandrel and the angularity thereto of the conveyor and winding belt. Also, the invention is applicable to winding two or more plies, for which purpose, if necessary, a second winder belt and conveyor may be positioned adjacent those herein shown or may be positioned on the opposite side of the mandrel.

The invention claimed is:

1. An apparatus for producing tubing including a mandrel about which strips of material are adapted to be spirally wound, a winder belt spirally lapped about said mandrel, a power drive operable to drive said belt, means for feeding said strips in prearranged overlapping formation to said mandrel in position to be received and spirally wound thereabout in said prearranged overlapping relation under the lapping of said belt, and a spirally wound plate embracing the lapping of said belt about the mandrel, said plate and mandrel being connected to opposite terminals of a source of high frequency electrical current to provide a high frequency electrical field within which the strips are spirally wound under pressure.

2. An apparatus for producing tubing including a mandrel about which strips of material are adapted to be spirally wound, an endless conveyor extending at an angle to the mandrel for receiving and feeding a pre-arranged series of stripe thereto, said conveyor having laterally stepped sections of different elevations conforming with and maintaining said strips in their overlapping relation in which they are wound about the mandrel, means for simultaneously winding said pre-arranged strips about said mandrel, and a power drive operably connected with said conveyor and winding means tending to feed said strips at greater speed than they are wound to create end abutting pressure thereon.

3. An apparatus for producing tubing including a mandrel about which strips of material are adapted to be spirally wound, an endless conveyor extending at an angle to the mandrel for receiving and feeding pre-arranged strips of material thereto and wherein each strip is formed of a plurality of end abutting pieces, means associated with said conveyor for maintaining said strips in said pre-arranged relation with their edges overlapping as they are spirally wound into tubular form, means for simultaneously winding said strips in said pre-arranged relation about said mandrel, and a power drive for driving said conveyor and winding means in timed relation wherein said conveyor is driven at greater speed than said winding means for tending to feed said strips at greater speed than permitted by the winding means to create end abutting pressure thereon.

4. An apparatus for producing tubing including a mandrel about which strips of material are adapted to be spirally wound, an endless conveyor extending at an angle to the mandrel for receiving and feeding pre-arranged strips of material thereto, said conveyor having laterally stepped sections of different elevations conforming with and maintaining said strips in the same overlapping relation in which they are wound about the mandrel, feeding rollers between which said strips are adapted to pass including a driving roller and a series of pressure rollers of different diameters in engagement with and corresponding to the different elevations of the overlapping strips being wound, means for receiving said strips from the conveyor in their pre-arranged relation and winding the same about the mandrel, and a power drive for driving said conveyor, winding means and feeding rollers in timed relation.

5. An apparatus for producing tubing including a mandrel about which a group of strips of material are adapted to be spirally wound, means for feeding said strips toward said mandrel, a fixed rigid guiding apron through which said strips are fed to said mandrel, said apron being mounted tangentially and at an angle to said mandrel in position to feed said strips thereto and internally stepped for receiving and confining said group of strips in pre-arranged overlapping formation in which they are finally wound into tubular form, and means for receiving said strips from said apron at the mandrel arranged to spirally wind them thereabout.

6. An apparatus for producing tubing including a mandrel about which strips of material are adapted to be spirally wound, a winder belt spirally lapped about said mandrel, a pair of driving pulleys positioned on each side of said mandrel for driving said belt at a predetermined angle thereto, an endless conveyor extending at a predetermined angle to the mandrel for receiving and feeding prearranged strips of material thereto, said conveyor having laterally stepped sections of different elevations conforming with and maintaining said strips in the overlapping relation in which they are wound about the mandrel, feeding rollers associated with said conveyor engageable with the strips thereon and including a driven roller and a series of pressure rollers of different diameters in engagement with and corresponding to the different elevations of the overlapping strips fed thereby, a fixed rigid guiding apron intermediate said rollers and mandrel for receiving, confining and directing said strips tangentially and at an angle to said mandrel for engagement by said belt, and a power drive for driving said conveyor, belt and rollers in timed relation, said belt being driven at a slower speed for creating end abutting pressure between sections of said strips as they are fed through said guiding apron.

7. An apparatus for producing tubing including a mandrel about which strips of material are adapted to be spirally wound, a winder belt spirally lapped about said mandrel, a pair of driving pulleys positioned on each side of said mandrel for driving said belt at a predetermined angle thereto, an endless conveyor extending at a predetermined angle to the mandrel for receiving and feeding prearranged strips of material thereto, said conveyor having laterally stepped sections of different elevations conforming with and maintaining said strips in the overlapping relation in which they are wound about the mandrel, feeding rollers associated with said conveyor engageable with the strips thereon and including a driven roller and a series of pressure rollers of different diameters in engagement with and corresponding to the different elevations of the overlapping strips fed thereby, a fixed rigid guiding apron intermediate said rollers and mandrel for receiving, confining and directing said strips tangentially and at an angle to said mandrel for engagement by said belt, a power drive for driving said conveyor, belt and rollers in timed relation, said belt being driven at a slower speed for creating end abutting pressure between sections of said strips as they are fed through said guiding apron, and an electrode adjacent the mandrel and lapping portion of the belt, said electrode and mandrel being connected with opposite terminals of a source of high frequency electrical current to provide a high frequency electrical field within which said strips are wound.

8. An apparatus for producing tubing including a mandrel about which strips of material are adapted to be spirally wound, a conveyor extending at an angle to the mandrel for receiving and feeding a pre-arranged group of strips thereto, said conveyor having laterally stepped sections of different elevations conforming with and maintaining said strips in pre-arranged overlapping relation in which they are wound about the mandrel, and means associated with said conveyor and mandrel for simultaneously winding said pre-arranged overlapping group of strips about said mandrel.

9. An apparatus for producing tubing including a mandrel about which strips of material are adapted to be spirally wound, a strip feeding member extending tangentially to the mandrel for receiving and feeding a prearranged group of strips thereto, said member having laterally stepped sections of different elevations conforming with and maintaining said strips in prearranged overlapping relation in which they are wound about the mandrel, and means associated with said member and mandrel for simultaneously winding said prearranged overlapping group of strips about said mandrel.

LYNN L. SEYMOUR.